(12) United States Patent
May (10) Patent No.: US 7,629,709 B2
(45) Date of Patent: Dec. 8, 2009

(54) REGULATION OF A DC TO DC CONVERTER

(75) Inventor: Marcus W. May, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 468 days.

(21) Appl. No.: 11/025,734

(22) Filed: Dec. 29, 2004

(65) Prior Publication Data

US 2006/0139819 A1 Jun. 29, 2006

(51) Int. Cl.
*H02J 3/00* (2006.01)
(52) U.S. Cl. .................................................. 307/82
(58) Field of Classification Search .................. 307/43, 307/82
See application file for complete search history.

(56) References Cited

U.S. PATENT DOCUMENTS

| | | | | |
|---|---|---|---|---|
| 5,635,773 | A * | 6/1997 | Stuart | 307/66 |
| 6,833,635 | B2 * | 12/2004 | Kippley | 307/83 |
| 6,841,983 | B2 * | 1/2005 | Thomas | 323/322 |
| 6,977,447 | B2 * | 12/2005 | May | 307/31 |
| 7,039,817 | B2 * | 5/2006 | Burnham et al. | 713/320 |
| 7,040,727 | B2 * | 5/2006 | Ryu et al. | 347/5 |
| 7,170,197 | B2 * | 1/2007 | Lopata | 307/70 |
| 2003/0137283 | A1 * | 7/2003 | Isomichi et al. | 320/162 |
| 2004/0105284 | A1 * | 6/2004 | May | 363/50 |
| 2004/0257055 | A1 * | 12/2004 | Aioanei | 323/282 |
| 2005/0088865 | A1 * | 4/2005 | Lopez et al. | 363/132 |
| 2005/0156579 | A1 * | 7/2005 | Moussaoui et al. | 323/224 |

OTHER PUBLICATIONS

Simon S. Ang & Alejandro Oliva Power switching Converters 2005 - CRC Press ISBN# 0824722450 pp. 136-137.*

* cited by examiner

*Primary Examiner*—Albert W Paladini
*Assistant Examiner*—Michael Rutland Wallis
(74) *Attorney, Agent, or Firm*—Ingrassia, Fisher & Lorenz, P.C.

(57) ABSTRACT

A method for regulating a DC to DC converter of a portable device begins by sensing deactivation of a non-battery power source of the portable device, wherein an internal supply voltage is derived from the non-battery power source. The method continues by obtaining an initial regulation value for the DC to DC converter, wherein the initial regulation value is based on a battery voltage and the internal supply voltage. The method continues by enabling the DC to DC converter based on the initial regulation value, wherein the DC to DC converter converts the battery voltage into the internal supply voltage such that transitioning from the non-battery power source to a battery power source provides the substantially constant internal supply voltage.

23 Claims, 7 Drawing Sheets

FIG. 3
2nd DC to DC converter 14 (boost converter)

FIG. 4
2nd DC to DC converter 14 (buck converter)

FIG. 5
internal supply voltage 28 @ transition w/o initial regulation value 44

FIG. 6
internal supply voltage 28 @ transition w/ initial regulation value 44

FIG. 7
internal supply voltage 28 & regulation control signals 42 of 2nd DC to DC converter 14 w/o initial regulation value 44

FIG. 8
internal supply voltage 28 & regulation control signals 42 w/ initial regulation value 44

REGULATION OF A DC TO DC CONVERTER

BACKGROUND OF THE INVENTION

1. Technical Field of the Invention

This invention is generally related to power conversion and more particularly to regulating a DC to DC converter.

2. Description of Related Art

Power supplies are known to take one voltage level and convert it to one or more different voltage levels and may be designed using a variety of topologies. For example, a power supply may be a switch mode power supply or ferro-resonance power supply. A switch mode power supply may be implemented using one of many switch-mode topologies. For example, a switch-mode power supply may be implemented as a buck converter, a boost converter, a half-bridge converter, or a full bridge converter.

Typically, if a switch-mode power supply is needed to provide a substantially amount of power (e.g. greater than 100 watts), the power supply will include a full bridge or a half-bridge converter. If a switch-mode power supply is needed for lower power applications, it will include a buck or boost converter topology. Generally, a buck converter produces an output voltage that is less than the input voltage while a boost converter produces an output voltage that is greater than the input voltage. Thus, in low power applications such as portable electronic devices, a buck or boost converter is generally utilized depending on the voltage of the power source and the voltage needed to power the circuitry of the portable electronic device.

For example, a portable electronic device may be designed to be powered from a lithium battery that produces a supply between 4.2 volts and 3.0 volts while CMOS integrated circuits in the device requiring a supply of 1.8 volts to 2.5 volts. In this example, a buck converter would be utilized to step down the battery voltage to a controlled 1.8 or 2.5 volts. If, however, the same portable electronic device were designed to be powered from a 1½ volt battery, the device would include a boost converter to step up the 1½ volts to 1.8 or 2.5 volts.

An issue with battery powered portable electronic devices arises when the device transitions from being powered by an external power source (e.g., an AC powered power supply, a battery charger, a USB connection, etc.) to being powered by the battery via a DC to DC converter. In this instance, since the DC to DC converter cannot instantaneously produce the internal supply voltage from the battery voltage, the power supply to the portable electronic devices droops substantially, which would cause noticeable interruption of proper operation of the portable electronic device (e.g., an MP3 player, a PDA, a cell phone, etc.).

Therefore, a need exists for a method and apparatus of regulating a DC to DC converter that powers portable devices to substantially avoid power supply droops during power source transitions.

BRIEF SUMMARY OF THE INVENTION

The regulation of a DC to DC converter of the present invention substantially meets these needs and others. In one embodiment, a method for regulating a DC to DC converter of a portable device begins by sensing deactivation of a non-battery power source of the portable device, wherein an internal supply voltage is derived from the non-battery power source. The method continues by obtaining an initial regulation value for the DC to DC converter, wherein the initial regulation value is based on a battery voltage and the internal supply voltage. The method continues by enabling the DC to DC converter based on the initial regulation value, wherein the DC to DC converter converts the battery voltage into the internal supply voltage such that transitioning from the non-battery power source to a battery power source provides the substantially constant internal supply voltage.

In another embodiment, a DC to DC converter for use by a portable device includes an energy transfer module, switching transistors, a feedback module, and a regulation module. The switching transistors are operably coupled to enable the energy transfer module to produce an internal supply voltage from a battery voltage, wherein the switching transistors are enabled in accordance with regulation control signals. The feedback module is operably coupled to produce a feedback signal based on the internal supply voltage. The regulation module is operably coupled to, in a steady state mode, generate the regulation control signals based on the feedback signal, wherein the regulation module is further operably coupled to, in a initialization mode, sense deactivation of a non-battery power source of the portable device; obtain an initial regulation value for the DC to DC converter, wherein the initial regulation value is based on the battery voltage and the internal supply voltage; and enable the DC to DC converter based on the initial regulation value, wherein the DC to DC converter converts the battery voltage into the internal supply voltage.

In yet another embodiment, a power source circuit for a portable device includes a first DC to DC converter and a second DC to DC converter. The first DC to DC converter, when enabled, is operable to convert a non-battery voltage into an internal supply voltage. The second DC to DC converter, when enabled, is operable to convert a battery voltage into the internal supply voltage. The second DC to DC converter includes an energy transfer module, switching transistors, a feedback module, and a regulation module. The switching transistors are operably coupled to enable the energy transfer module to produce an internal supply voltage from a battery voltage, wherein the switching transistors are enabled in accordance with regulation control signals. The feedback module is operably coupled to produce a feedback signal based on the internal supply voltage. The regulation module is operably coupled to, in a steady state mode, generate the regulation control signals based on the feedback signal, wherein the regulation module is further operably coupled to, in a initialization mode, sense deactivation of a non-battery power source of the portable device; obtain an initial regulation value for the DC to DC converter, wherein the initial regulation value is based on the battery voltage and the internal supply voltage; and enable the DC to DC converter based on the initial regulation value, wherein the DC to DC converter converts the battery voltage into the internal supply voltage.

DETAILED DESCRIPTION OF THE DRAWINGS

Figure 1:
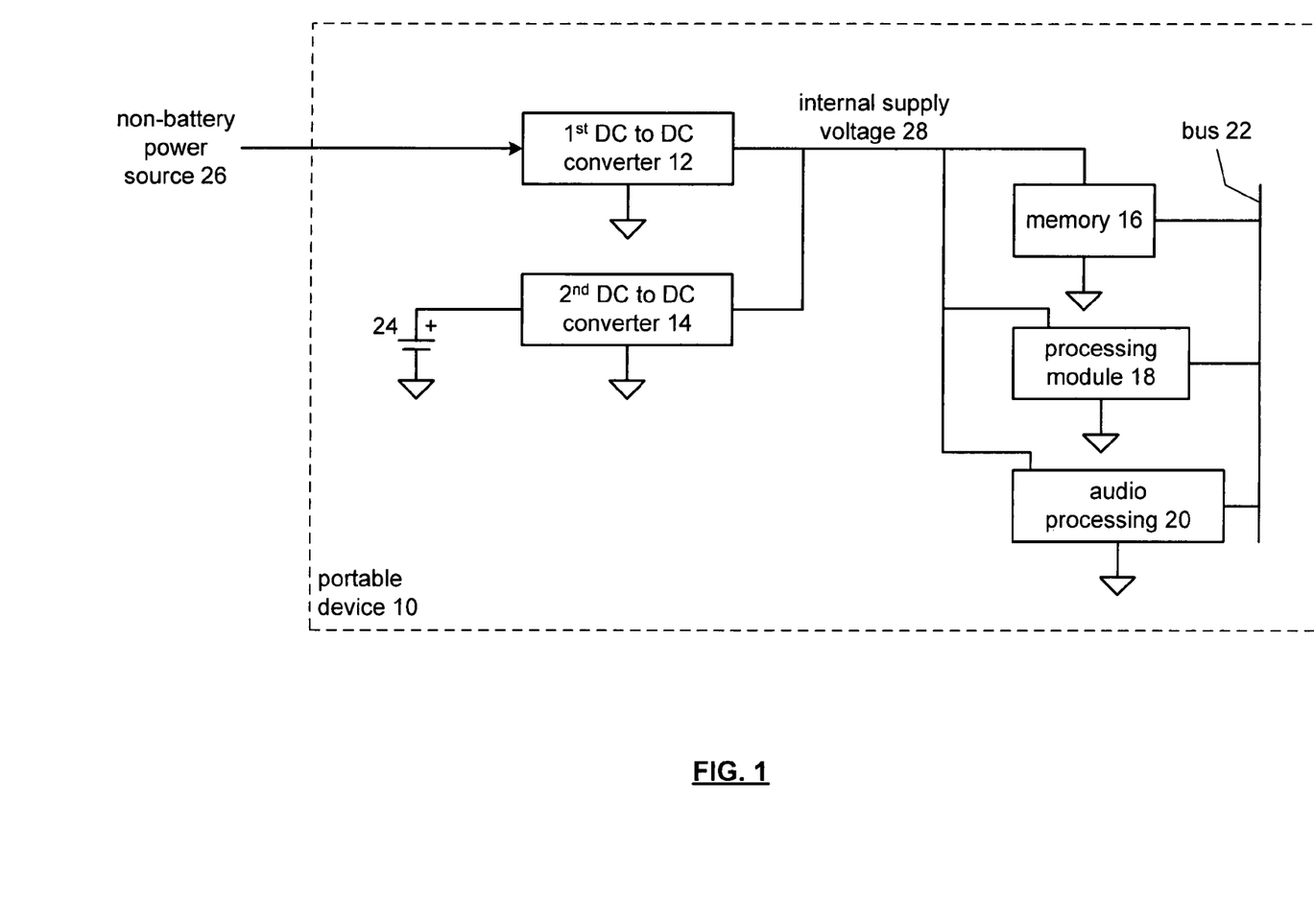
FIG. 1 is a schematic block diagram of a portable electronic device in accordance with the present invention.

FIG. 1 is a schematic block diagram of a portable electronic device 10 that includes a 1st DC-to-DC converter 12, a $2^{nd}$ DC-to-DC converter 14, memory, processing module 18, audio processing 20, bus 22 and a battery 24. The $1^{st}$ and $2^{nd}$ DC-to-DC converters comprise a power source circuit for the portable electronic device as will be described in greater detail with reference to FIG. 2.

In general, the $1^{st}$ DC-to-DC converter 12 converts a non-battery power source 26 into the internal supply voltage 28 when the non-battery power source 26 is available. The non-battery power source 26 may be a USB connection, an AC-to-DC power converter, and/or any other conventional non-battery power source. When the non-battery power source 26 is not available, the $2^{nd}$ DC-to-DC converter 14 converts the battery voltage into the internal supply voltage 28.

The processing module 18 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module 18 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The memory stores, and the processing module 18 executes, operational instructions corresponding to at least some of the steps and/or functions illustrated in FIGS. 1-10.

The audio processing 20 may include flash memory for storing MP3 files or other audio files and/or include audio playback and/or audio recording circuitry. In addition, the portable electronic device 10 may include streaming video or still video recording and playback circuitry such as digital camera, portable DVD player, et cetera.

Figure 2:
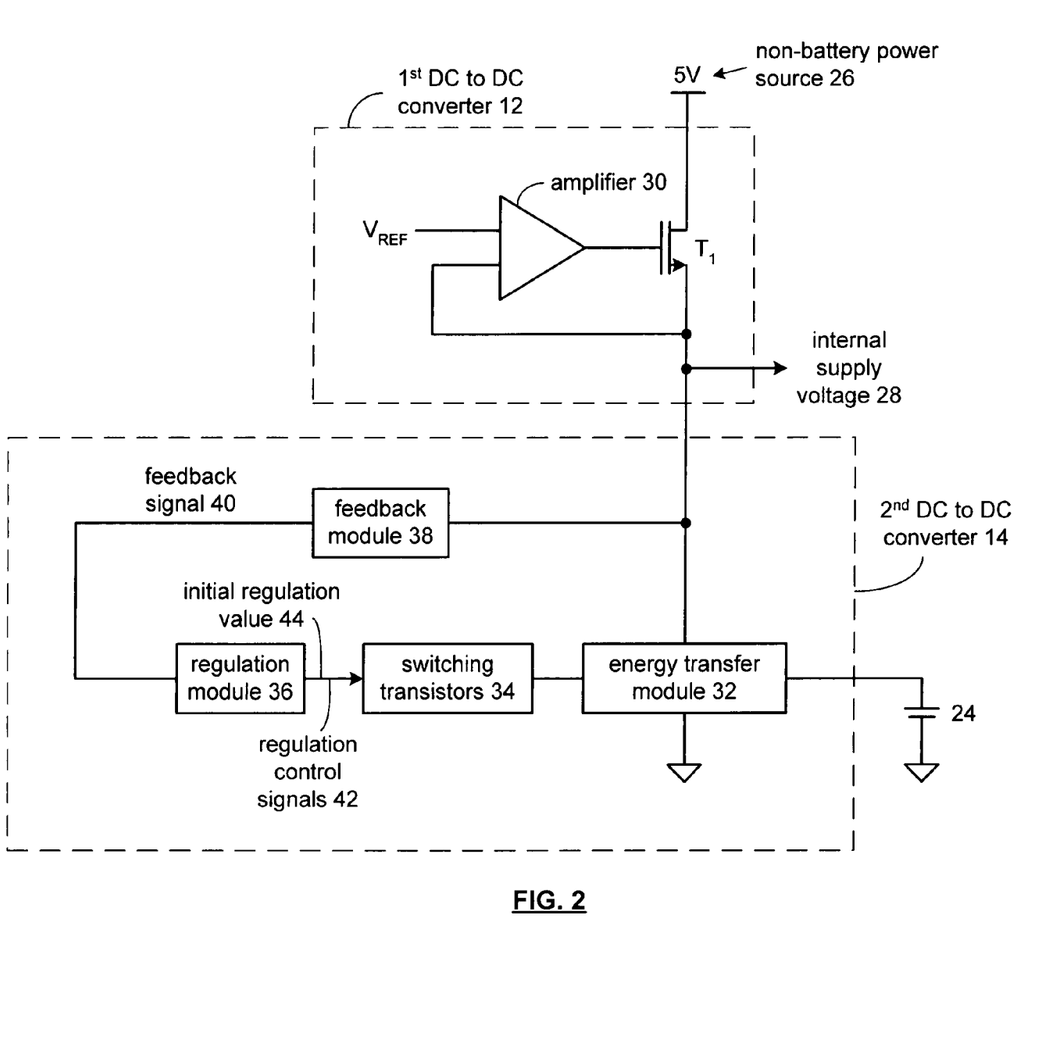
FIG. 2 is a schematic block diagram of a power source circuit for a portable electronic device in accordance with the present invention.

FIG. 2 is a schematic block diagram of a power source circuit for use within a portable electronic device. The power source circuit includes the $1^{st}$ DC-to-DC converter 12 and the $2^{nd}$ DC-to-DC converter 14. The $1^{st}$ DC-to-DC converter 12 may include an amplifier 30 and a transistor. The drain of the transistor is coupled to the non-battery power source 26, which may be a 5 volt source via a USB (Universal Serial Bus) connection. The inputs of the amplifier 30 are a voltage reference, which tunes the internal supply voltage 28, and the source of the transistor. In this configuration, the $1^{st}$ DC-to-DC converter linearly regulates the internal supply voltage 28 from the non-battery powered source 26.

The $2^{nd}$ DC-to-DC converter 14 may be a switch mode converter that includes an energy transfer module 32, switching transistors 34, regulation module 36 and a feedback module 38. When the non-battery power source 26 is not available, the $2^{nd}$ DC-to-DC converter 14 is activated to convert the battery voltage 24 into the internal supply voltage 28.

In a steady state mode of operation, the feedback module 38 senses the internal supply voltage 28 to produce a feedback signal 40. The regulation module 36 receives the feedback signal and generates regulation control signals 42 there from. The switching transistors 34 are enabled based on the regulation control signals 42 to control the energy transfer properties of the energy transfer module 32 (e.g., an inductor and capacitor as shown in FIGS. 3 and 4) to produce the internal supply voltage 28 from the battery voltage 24.

At start-up of the $2^{nd}$ DC-to-DC converter 14, the regulation module 36 forces the regulation control signals 42 to an initial regulation value 44 such that the regulation control signals 42 are at, or near, a steady state value at the start-up of the DC-to-DC converter 14. In this manner, the transition from the non-battery power source 26 to battery power 24, has minimal droop in the internal supply voltage when transitioning from the $1^{st}$ DC-to-DC converter 12 to the $2^{nd}$ DC-to-DC converter 14.

The regulation module 36 generates the initial regulation value 44 based on the desired duty cycle for the $2^{nd}$ DC-to-DC converter using known properties of the topology of the DC-to-DC converter. This will be described in greater detail with reference to FIGS. 3 and 4.

Figure 3:
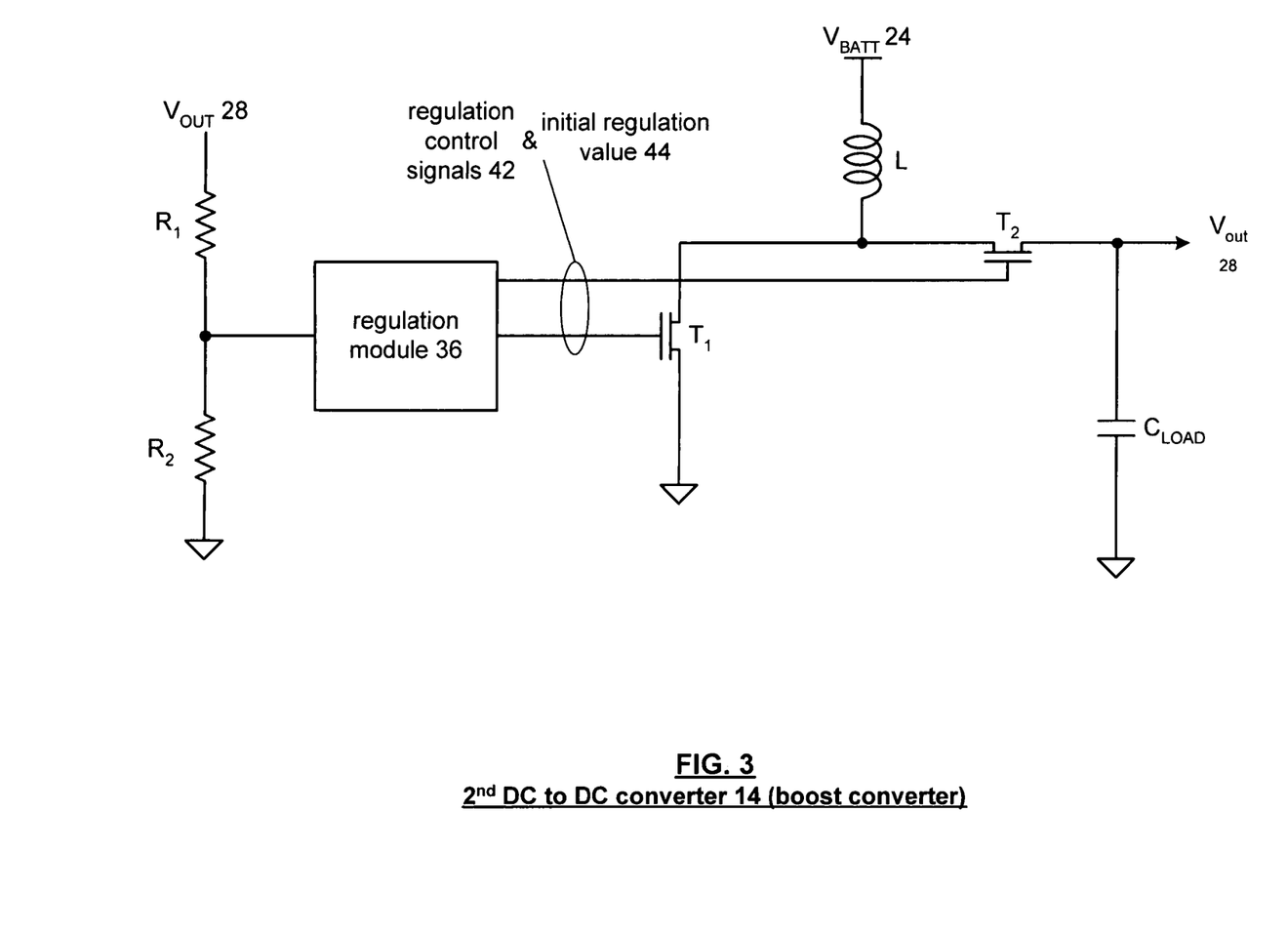
FIG. 3 is a schematic block diagram of a boost DC-to-DC converter in accordance with the present invention.
Figure 4:
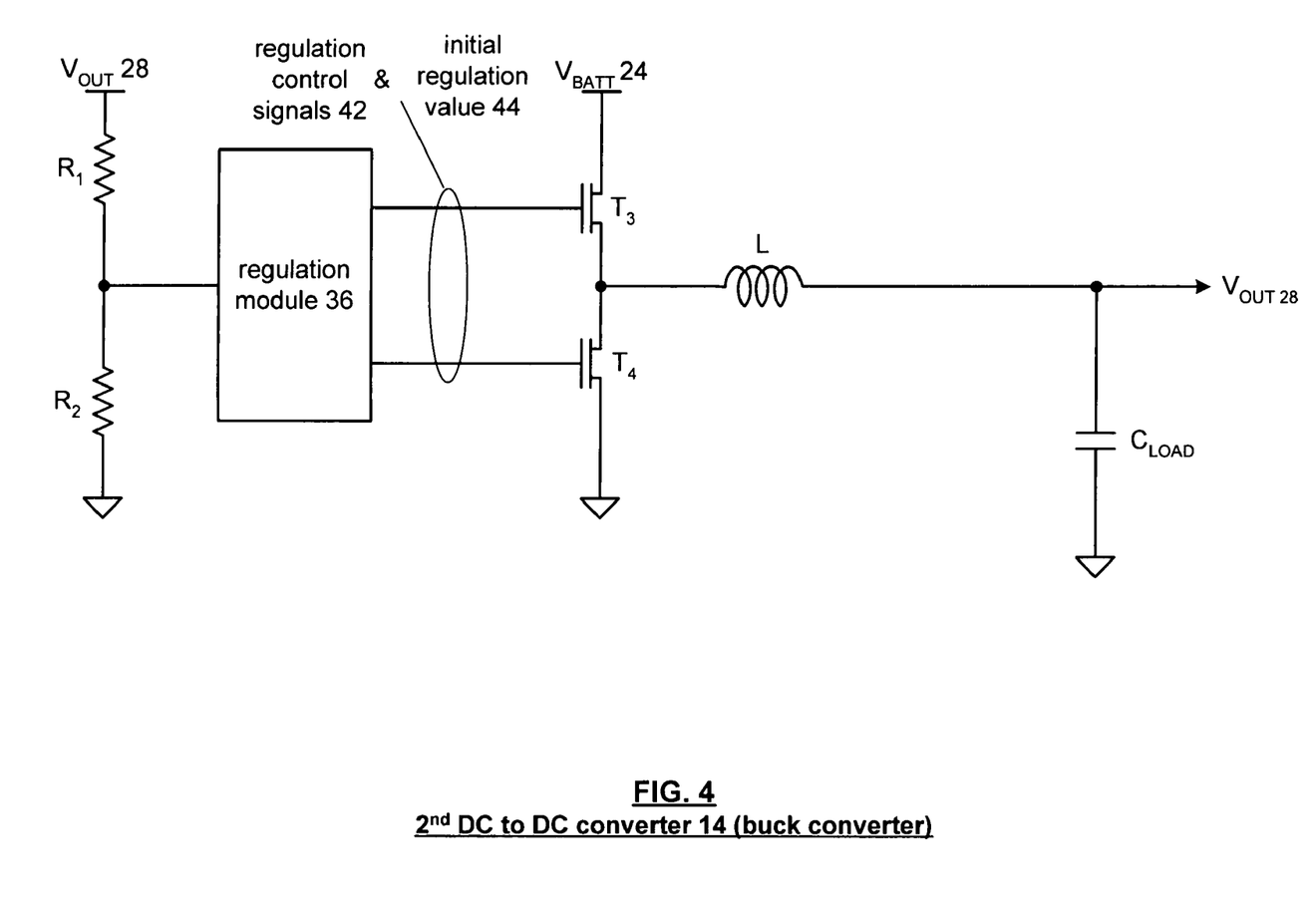
FIG. 4 is a schematic block diagram of a buck DC-to-DC converter in accordance with the present invention.

FIG. 3 is a schematic block diagram of the $2^{nd}$ DC-to-DC converter 14 implemented as a boost converter. In this embodiment, the DC-to-DC converter 14 includes resistor dividers R1, R2, switching transistors T1, T2, energy transfer elements inductor L and capacitor $C_{load}$ and the regulation module 36. As is known, the steady state duty cycle for a boost converter with respect to the charge phase of the conversion corresponds to $V_{out}-V_{batt}$ divided by $V_{out}$. The charge phase corresponds to, in the boost converter, T1 being on to build energy in inductor L. Accordingly, knowing the duty cycle for the steady state condition of producing the desired output, the regulation module 34 may utilize this initial regulation setting to produce the switching control signals 42 for transistors T1 and T2 such that the DC-to-DC converter starts-up at the steady state condition for the switching transistors. As such, the output voltage 28 will achieve the desired level much more quickly (i.e., significantly less cycles than when the regulation module 36 starts from a zero voltage condition).

FIG. 4 is a schematic block diagram of the DC-to-DC converter 14 implemented as a buck converter. In this embodiment, the feedback module includes the resistive divider R1, R2, the regulation module 36, switching transistors T3, T4 and energy transfer elements inductor L and capacitor $C_{load}$. The duty cycle for a buck converter is known to be, with respect to the charge phase of the conversion, $V_{out}$ divided by $V_{batt}$. By knowing the duty cycle required to generate the internal supply voltage, with reference to the battery voltage, the regulation module may utilize this initial regulation value 44 to enable transistors T3 and T4 at start-up of the buck converter 14 to achieve steady state condition of the output voltage 28 much more quickly than without the use of the initial regulation value 44.

Figure 5:
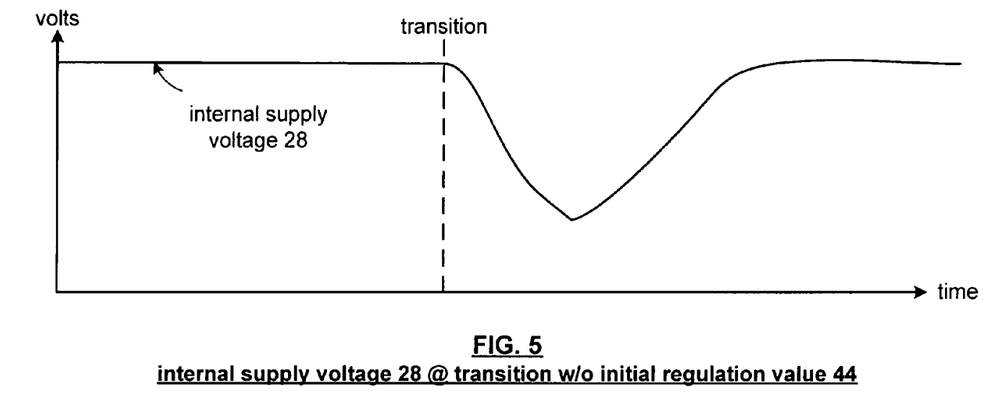
FIG. 5 is a diagram depicting the internal supply voltage of the power source circuit at a power transition without use of the initial regulation value.

FIG. 5 illustrates a diagram of a power transition and the effects on the internal supply voltage 28 when the regulation module 36 does not use the initial regulation value 44. As shown, prior to the power transition, the $1^{st}$ DC-to-DC converter is producing the internal supply voltage 28. At the transition, the $1^{st}$ DC-to-DC converter is turned off and the second DC-to-DC converter is enabled. Since the load has not been removed and the $2^{nd}$ DC-to-DC converter 14 takes time to produce the desired supply voltage level, the energy in the load capacitor is providing the energy for the load, which causes the internal supply voltage 28 to droop. As the $2^{nd}$ DC-to-DC converter ramps up, it supplies energy to the load capacitor, thus causing the internal supply voltage 28 to rise until the desired voltage level is reached. Once the internal supply voltage 28 reaches the desired voltage level, the $2^{nd}$ DC-to-DC converter enters the steady-state condition. In this instance, for most portable electronic devices, the device must be disabled until the $2^{nd}$ DC-to-DC converter 14 reaches the steady state condition.

Figure 6:
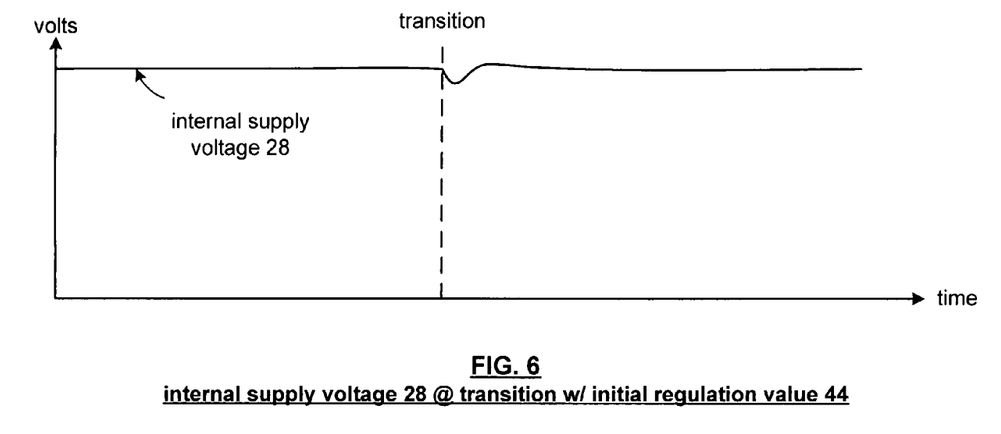
FIG. 6 is a diagram of the internal supply voltage at a power transition using the initial regulation value in accordance with the present invention.

FIG. 6 illustrates a diagram of the output voltage produced during a power transition when the regulation module utilizes the initial regulation value 44. In this instance, when a power transition occurs, the regulation of the $2^{nd}$ DC-to-DC converter 14 starts at the initial regulation value such that it reaches the steady state condition for the internal supply voltage 28 much more rapidly than in FIG. 5. As such, the droop in the internal supply voltage 28 is significantly less thereby eliminating, or substantially reducing, the inoperable period of the portable electronic device.

Figure 7:
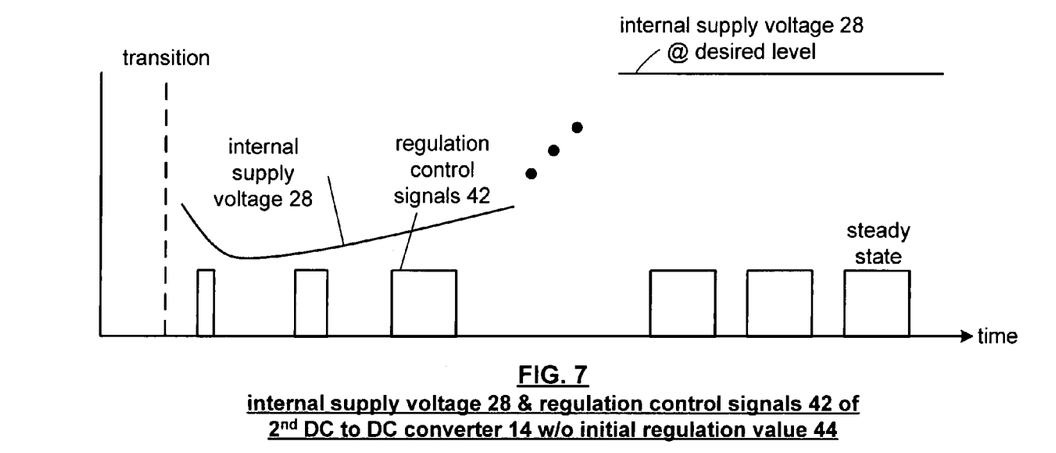
FIG. 7 is a diagram depicting the internal supply voltage and the regulation control signals without the use of the initial regulation value.

FIG. 7 is a diagram depicting the internal supply voltage 28 and the regulation control signals 42 produced by the regulation module 36 without the use of the initial regulation value 44. As shown, at the power transition, the duty cycle of the regulation signals 42 is relatively narrow. With the narrow duty cycle of the regulation signals 42, the output voltage 28 increases slowly until the duty cycle of the regulation signals reaches a steady state condition. At the steady state condition of the regulation signals 42, the output voltage 28 is at its desired level.

Figure 8:
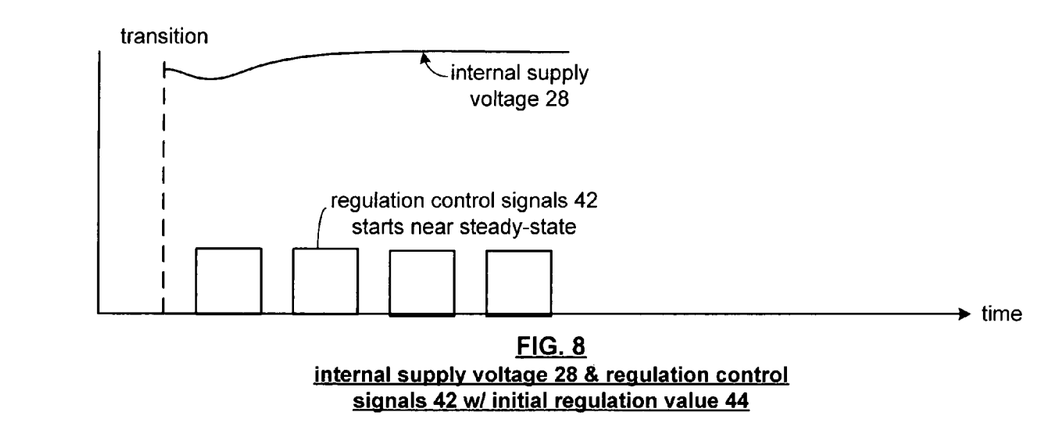
FIG. 8 is a diagram depicting the internal supply voltage and the regulation control signals at a power transition using the initial regulation value in accordance with the present invention.

FIG. 8 is a diagram of the regulation signals 42 and the internal supply voltage 28 when the control module 36 utilizes the initial regulation value. In this instance, when a power transition occurs, the duty cycle for the regulation signals 42 starts at, or near, the steady state duty cycle value. As such, the output voltage 28 does not change significantly with reference to FIG. 7 thereby achieving a steady state value much more quickly.

Figure 9:
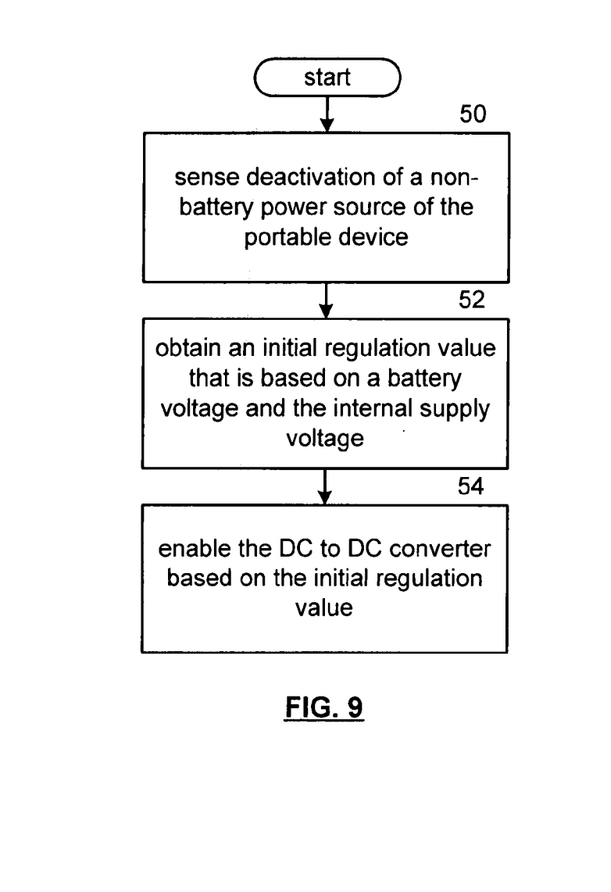
FIG. 9 is a logic diagram of a method for regulating a DC-to-DC converter of a portable electronic device in accordance with the present invention.

FIG. 9 is a logic diagram of a method for regulating a DC-to-DC converter of a portable electronic device in accordance with the present invention. The process begins at Step 50 where the power source circuit senses deactivation of a non-battery power source of the portable electronic device. The process then proceeds to Step 52 where an initial regulation value that is based on the battery voltage and a internal supply voltage is obtained. This may be done by accessing a lookup table, retrieving the initial regulation value from memory and/or generating it via an initial regulation circuit. Further, the initial regulation value may be determined while the non-battery power source is actively powering the portable electronic device. For example, for a boost converter the initial regulation value may be determined based on the steady state duty cycle of the boost converter which is ($V_{out}$−$V_{batt}$) divided by $V_{out}$. For a buck converter, the initial regulation value corresponds to the steady state duty cycle which may be calculated as $V_{out}$ divided by $V_{batt}$.

The process then proceeds to Step 54 where the DC-to-DC converter is enabled in a force regulation mode based on the initial regulation value. Once the DC-to-DC converter is enabled in the force regulation mode, the close loop system is engaged and the DC-to-DC converter operates in a normal mode utilizing the feedback loop to regulate the DC-to-DC converter.

Figure 10:
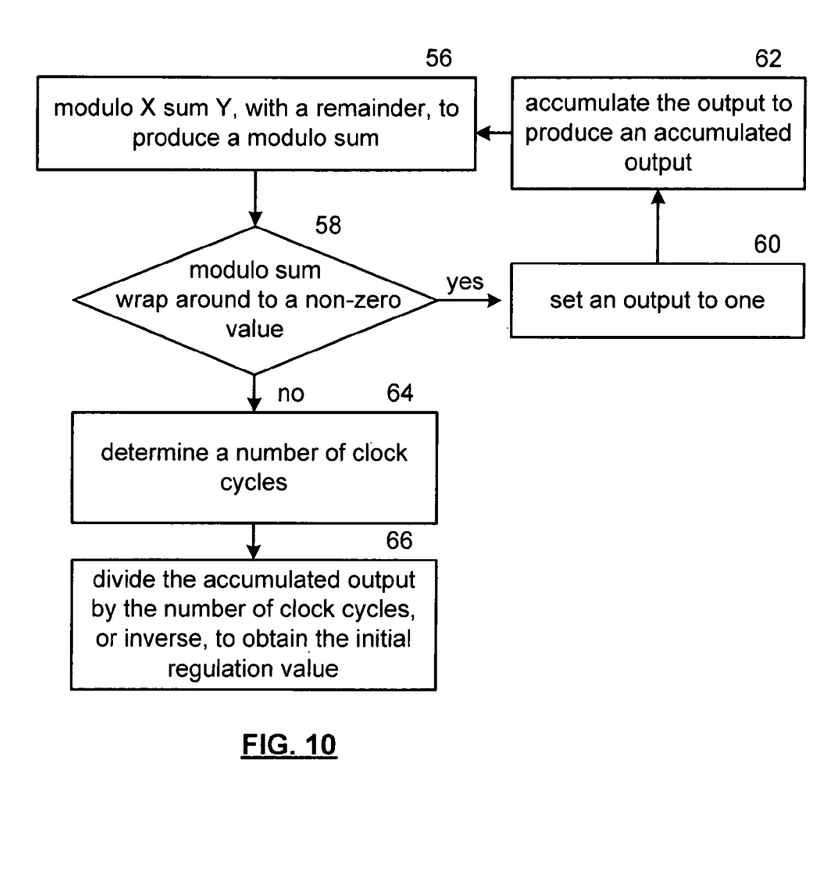
FIG. 10 is a logic diagram of a method for determining the initial regulation value.

FIG. 10 is a logic diagram of a method for calculating the initial regulation value utilizing a digital circuitry by dividing Y by X. The process begins at Step 56 where modulo X summing of Y, with a remainder is used on a cycle-by-cycle basis to determine a modulo sum. For a buck converter X represents the battery voltage and Y represents the internal supply voltage and for a boost converter X represents the internal supply voltage and Y represents the internal supply voltage less the battery voltage. The modulo X summing of Y, with a remainder, can be further illustrated in table 1.

TABLE 1

| | X = 5, Y = 1.5 | |
|---|---|---|
| Clock Cycle | Modulo Sum | Output |
| 1 | 1.5 | 0 |
| 2 | 3 | 0 |
| 3 | 4.5 | 0 |
| 4 | 1 (6.0 − 5) | 1 |
| 5 | 2.5 | 0 |
| 6 | 4 | 0 |
| 7 | 0.5 (5.5 − 5) | 1 |
| 8 | 2 | 0 |
| 9 | 3.5 | 0 |
| 10 | 0 (5 − 5) | 1 |
| ... | ... | ... |
| M | sum | $b_M$ |

In this example, X=5 and Y=1.5 where Y is divided by X. From simple mathematics, when 1.5 is divided by 5 the result is 0.33. To achieve this value using the algorithm of FIG. 10, the value Y (e.g., 1.5 is added to an accumulated value of the summation of Y until it reaches or exceeds the value of X.) When the accumulation of Y reaches or exceeds the value of X, a remainder is used as the next value to which the current value of Y is added. This process continues, on a cycle by cycle basis, until M cycles (e.g., 32 or some other readily available count value) have been processed.

Returning to the logic diagram of FIG. 10, the process proceeds to Step 58 where a determination is made as to whether the modulo sum wraps around to a non-zero value. If the value does wrap around to a non-zero value, which occurs at cycle 4 in table 1, the process proceeds to Step 60 where the output is set to 1. The process then proceeds to Step 62 where the output is accumulated to produce accumulated output.

The process then proceeds to Step 64 where a determination is made as to whether M clock cycles have been processed. If not, the processing of the modulo X summing of Y continues. Once M clock cycles have been processed, the process proceeds to Step 66 where, for a boost converter, the accumulated output is divided by the number of cycles (e.g., M) to obtain the initial regulation value. For a buck converter, the number of clock cycles (e.g., M) is divided by the accumulated value to obtain the initial regulation value.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a method and apparatus for regulating a DC-to-DC converter to reduce the droop when transitioning from an external power source to a battery power source. As one of average skill in the art will appreciate, other embodiments may be derived from the teaching of the present invention without deviating from the scope of the claims.

What is claimed is:

1. A method for regulating a second DC to DC converter of a battery powered portable electronic device comprising a first DC to DC converter and a second DC to DC converter to provide a substantially constant internal supply voltage, wherein the first DC to DC converter is configured to provide an internal supply voltage for the battery powered portable electronic device that is derived from a non-battery power source and the second DC to DC converter is configured to provide an internal supply voltage for the battery powered portable electronic device that is derived from a battery voltage, the method comprises:
    sensing deactivation of the first DC to DC converter;
    obtaining an initial regulation value for an initial duty cycle of the second DC to DC converter, wherein the initial regulation value is based on the battery voltage and the internal supply voltage; and
    enabling the second DC to DC converter with the initial duty cycle based on the initial regulation value, wherein the second DC to DC converter converts the battery voltage into the internal supply voltage such that transitioning from the non-battery power source to a battery power source provides the substantially constant internal supply voltage.

2. The method of claim 1, wherein the obtaining the initial regulation value for the initial duty cycle comprises at least one of:
    accessing a look up table;
    retrieving the initial regulation value from memory; and
    determining the initial regulation value using an initial regulation circuit.

3. The method of claim 1 comprises:
    determining the initial regulation value based on the battery voltage and the internal supply voltage while the non-battery power source is actively powering the battery powered portable electronic device.

4. The method of claim 3 comprises, for a boost converter:
    calculating the initial regulation value with respect to a charge phase of energy conversion of the second DC to DC converter as (Vout−Vbatt)/Vout, where Vout is the internal supply voltage and Vbatt is the battery voltage.

5. The method of claim 4, wherein the calculating the initial regulation value comprises:
    modulo X summing Y, with a remainder, to produce a modulo sum, wherein X represents the internal supply voltage and Y represents the internal supply voltage less the battery voltage;
    on a clock cycle by clock cycle basis:
        determining when the modulo sum wraps around to a non-zero value;
        when the modulo sum wraps around to the non-zero value, setting an output to one;
        accumulating the output to produce an accumulated output;
    when M number of clock cycles have been processed, dividing the accumulated output by the M number of clock cycles to obtain the initial regulation value.

6. The method of claim 3 comprises, for a buck converter:
    calculating the initial regulation value with respect to a charge phase of energy conversion of the second DC to DC converter as Vout/Vbatt, where Vout is the internal supply voltage and Vbatt is the battery voltage.

7. The method of claim 6, wherein the calculating the initial regulation value comprises:
    modulo X summing Y, with a remainder, to produce a modulo sum, wherein Y represents the internal supply voltage and X represents the battery voltage;
    on a clock cycle by clock cycle basis:
        determining when the modulo sum wraps around to a non-zero value;
        when the modulo sum wraps around to the non-zero value, setting an output to one;
        accumulating the output to produce an accumulated output;
    when M number of clock cycles have been processed, dividing the accumulated output by the M number of clock cycles to obtain the initial regulation value.

8. The method of claim 1 further comprises:
    switching to a feedback loop regulation of the DC to DC regulation after the enabling of the second DC to DC converter based on the initial regulation value.

9. A DC to DC converter for use by a portable device comprising:
    an energy transfer module;
    a switch operably coupled to enable the energy transfer module to produce a internal supply voltage from a battery voltage, wherein the switching transistors are enabled in accordance with regulation control signals;
    a feedback module operably coupled to produce a feedback signal based on the internal supply voltage; and
    a regulation module operably coupled to, in a steady state mode, generate the regulation control signals based on the feedback signal, wherein the regulation module is further operably coupled, in an initialization mode, to:
        sense deactivation of a non-battery power source of the portable device, wherein an internal supply voltage is derived from the non-battery power source;
        obtain an initial regulation value for the DC to DC converter, wherein the initial regulation value is based on a battery voltage and the internal supply voltage; and enable the DC to DC converter based on the initial regulation value, wherein the DC to DC converter converts the battery voltage into the internal supply voltage such that transitioning from the non-battery power source to a battery power source provides the substantially constant internal supply voltage; and calculate the initial regulation value by:

modulo X summing Y, with a remainder, to produce a modulo sum, wherein X represents the internal supply voltage and Y represents the desired output value less the battery voltage;

on a clock cycle by clock cycle basis:

determining when the modulo sum wraps around to a non-zero value;

when the modulo sum wraps around to the non-zero value, setting an output to one;

accumulating the output to produce an accumulated output;

when M number of clock cycles have been processed, dividing the accumulated output by the M number of clock cycles to obtain the initial regulation value.

10. A power source circuit for a battery powered portable electronic device, wherein the power source circuit comprises:

a first DC to DC converter, when enabled, operable to convert a non-battery voltage into an internal supply voltage; and a second DC to DC converter, when enabled, operable to convert a battery voltage into the internal supply voltage, wherein the second DC to DC converter includes:

energy transfer module;

a switch operably coupled to enable the energy transfer module to produce the internal supply voltage from the battery voltage, wherein the switch is enabled in accordance with regulation control signals;

feedback module operably coupled to produce a feedback signal based on the internal supply voltage; and regulation module operably coupled to, in a steady state mode, generate the regulation control signals based on the feedback signal, wherein the regulation module is further operably configured to, in an initialization mode:

sense deactivation of the first DC to DC converter;

obtain an initial regulation value for an initial duty cycle of the second DC to DC converter, wherein the initial regulation value is based on a battery voltage and the internal supply voltage; and enable the second DC to DC converter with the initial duty cycle based on the initial regulation value, wherein the second DC to DC converter converts the battery voltage into the internal supply voltage such that transitioning from the non-battery power source to a battery power source provides the substantially constant internal supply voltage.

11. The power source circuit of claim 10, wherein the regulation module, in the initialization mode, is further operably coupled to obtain the initial regulation value by at least one of:

accessing a look up table;

retrieving the initial regulation value from memory; and determining the initial regulation value using an initial regulation circuit.

12. The power source circuit of claim 10, wherein the regulation module, in the initialization mode, is further operably coupled to:

determine the initial regulation value based on the battery voltage and the internal supply voltage while the non-battery power source is actively powering the battery powered portable electronic device.

13. The power source circuit of claim 12, wherein the regulation module, in the initialization mode, is further operably coupled to, for a boost converter:

calculate the initial regulation value with respect to a charge phase of energy conversion of the second DC to DC converter as (Vout−Vbatt)/Vout, where Vout is the internal supply voltage and Vbatt is the battery voltage.

14. The power source circuit of claim 13, wherein the regulation module, in the initialization mode, is further operably coupled to calculate the initial regulation value by:

modulo X summing Y, with a remainder, to produce a modulo sum, wherein X represents the internal supply voltage and Y represents the desired output value less the battery voltage;

on a clock cycle by clock cycle basis:

determining when the modulo sum wraps around to a non-zero value;

when the modulo sum wraps around to the non-zero value, setting an output to one;

accumulating the output to produce an accumulated output;

when M number of clock cycles have been processed, dividing the accumulated output by the M number of clock cycles to obtain the initial regulation value.

15. The power source circuit of claim 12, wherein the regulation module, in the initialization mode, is further operably coupled to, for a buck converter:

calculate the initial regulation value with respect to a charge phase of energy conversion of the second DC to DC converter as Vout/Vbatt, where Vout is the internal supply voltage and Vbatt is the battery voltage.

16. The power source circuit of claim 15, wherein the regulation module, in the initialization mode, is further operably coupled to calculate the initial regulation value comprises:

modulo X summing Y, with a remainder, to produce a modulo sum, wherein Y represents the internal supply voltage and X represents the battery voltage;

on a clock cycle by clock cycle basis:

determining when the modulo sum wraps around to a non-zero value;

when the modulo sum wraps around to the non-zero value, setting an output to one;

accumulating the output to produce an accumulated output;

when M number of clock cycles have been processed, dividing the accumulated output by the M number of clock cycles to obtain the initial regulation value.

17. The power source circuit of claim 10, wherein the regulation module is further operably coupled to:

transition from the initialization mode to the steady state mode after the enabling of the second DC to DC converter based on the initial regulation value.

18. A battery powered portable electronic device comprising:

a non-battery power source associated with a first DC to DC converter that, when enabled, is operable to convert a non-battery voltage into an internal supply voltage; and a battery associated with a second DC to DC converter that, when enabled, is operable to convert a battery voltage into the internal supply voltage, wherein the second DC to DC converter includes:

an energy transfer module;

a switch operably coupled to enable the energy transfer module to produce the internal supply voltage from the battery voltage, wherein the switch is enabled in accordance with regulation control signals;

a feedback module operably coupled to produce a feedback signal based on the internal supply voltage; and a regulation module operably configured to generate the regulation control signals based on the feedback signal in a steady state mode, wherein the regulation module is further configured in an initialization mode to:

sense deactivation of the first DC to DC converter;

obtain an initial regulation value for an initial duty cycle of the second DC to DC converter, wherein the initial regulation value is based on a battery voltage and the internal supply voltage; and enable the second DC to DC converter with the initial duty cycle based on the initial regulation value, wherein the second DC to DC converter converts the battery voltage into the internal supply voltage such that transitioning from the non-battery power source to a battery power source provides the substantially constant internal supply voltage to the battery powered portable electronic device.

19. The battery powered portable electronic device of claim 18, wherein the regulation module, in the initialization mode, is further configured to calculate the initial regulation value with respect to a charge phase of energy conversion of the second DC to DC converter as Vout/Vbatt, where Vout is the internal supply voltage and Vbatt is the battery voltage.

20. The battery powered portable electronic device of claim 19, wherein the regulation module, in the initialization mode, is further configured to calculate the initial regulation value, wherein the calculation comprises:

modulo X summing Y, with a remainder, to produce a modulo sum, wherein Y represents the internal supply voltage and X represents the battery voltage;

on a clock cycle by clock cycle basis:

determining when the modulo sum wraps around to a non-zero value;

when the modulo sum wraps around to the non-zero value, setting an output to one;

accumulating the output to produce an accumulated output;

when M number of clock cycles have been processed, dividing the accumulated output by the M number of clock cycles to obtain the initial regulation value.

21. The battery powered portable electronic device of claim 18, wherein the regulation module is further configured to transition from the initialization mode to the steady state mode after the enabling of the second DC to DC converter based on the initial regulation value.

22. The battery powered portable electronic device of claim 18, wherein the regulation module, in the initialization mode, is further configured to obtain the initial regulation value by at least one of:

accessing a look up table;

retrieving the initial regulation value from memory; and determining the initial regulation value using an initial regulation circuit.

23. The battery powered portable electronic device of claim 18, wherein the regulation module, in the initialization mode, is further configured to determine the initial regulation value based on the battery voltage and the internal supply voltage while the non-battery power source is actively powering the battery powered portable electronic device.

* * * * *

UNITED STATES PATENT AND TRADEMARK OFFICE
CERTIFICATE OF CORRECTION

| | |
|---|---|
| PATENT NO. | : 7,629,709 B2 |
| APPLICATION NO. | : 11/025734 |
| DATED | : December 8, 2009 |
| INVENTOR(S) | : Marcus W. May |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 856 days.

Signed and Sealed this

Second Day of November, 2010

David J. Kappos
*Director of the United States Patent and Trademark Office*